Dec. 20, 1966　　　J. R. THOMPSON　　　3,292,908
HEAD MOUNTING FOR MAIN AND HAULBACK SHEAVES OF A LOGGING SPAR
Filed Feb. 4, 1965　　　　　　　　　　　　　　2 Sheets-Sheet 2
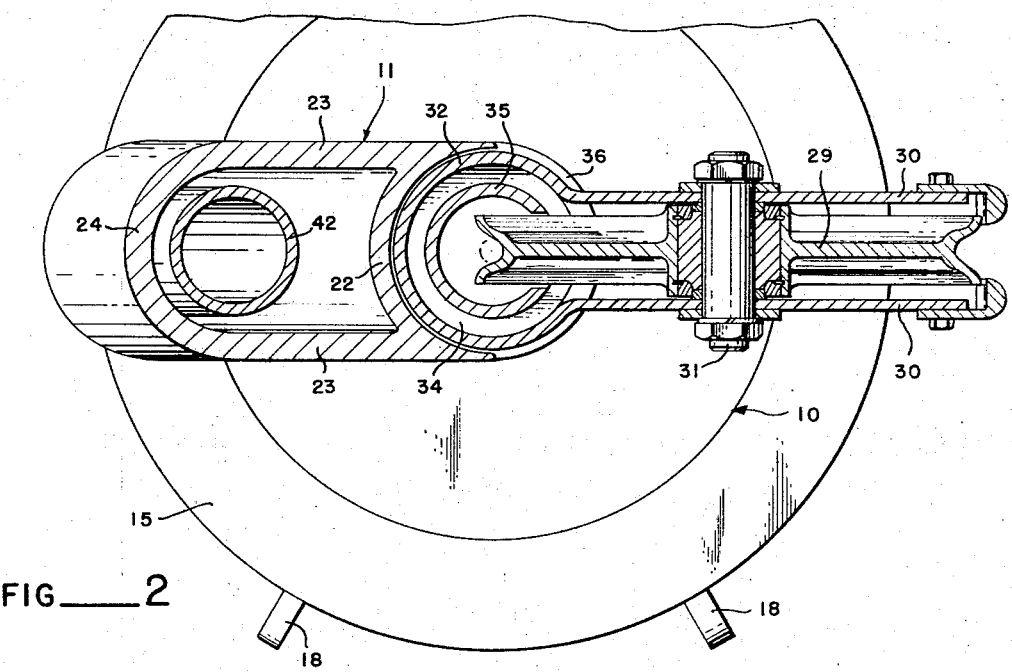
FIG__2
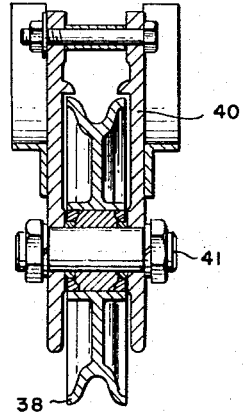
FIG__3
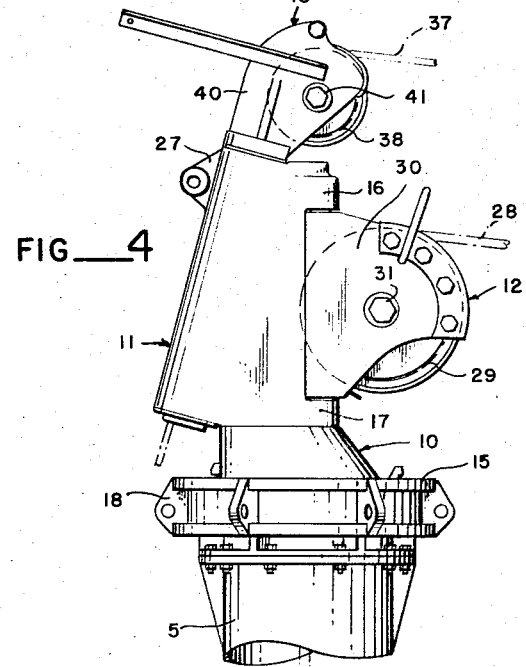
FIG__4
INVENTOR.
JAMES R. THOMPSON
BY
Seed & Berry
ATTORNEYS United States Patent Office 3,292,908
Patented Dec. 20, 1966

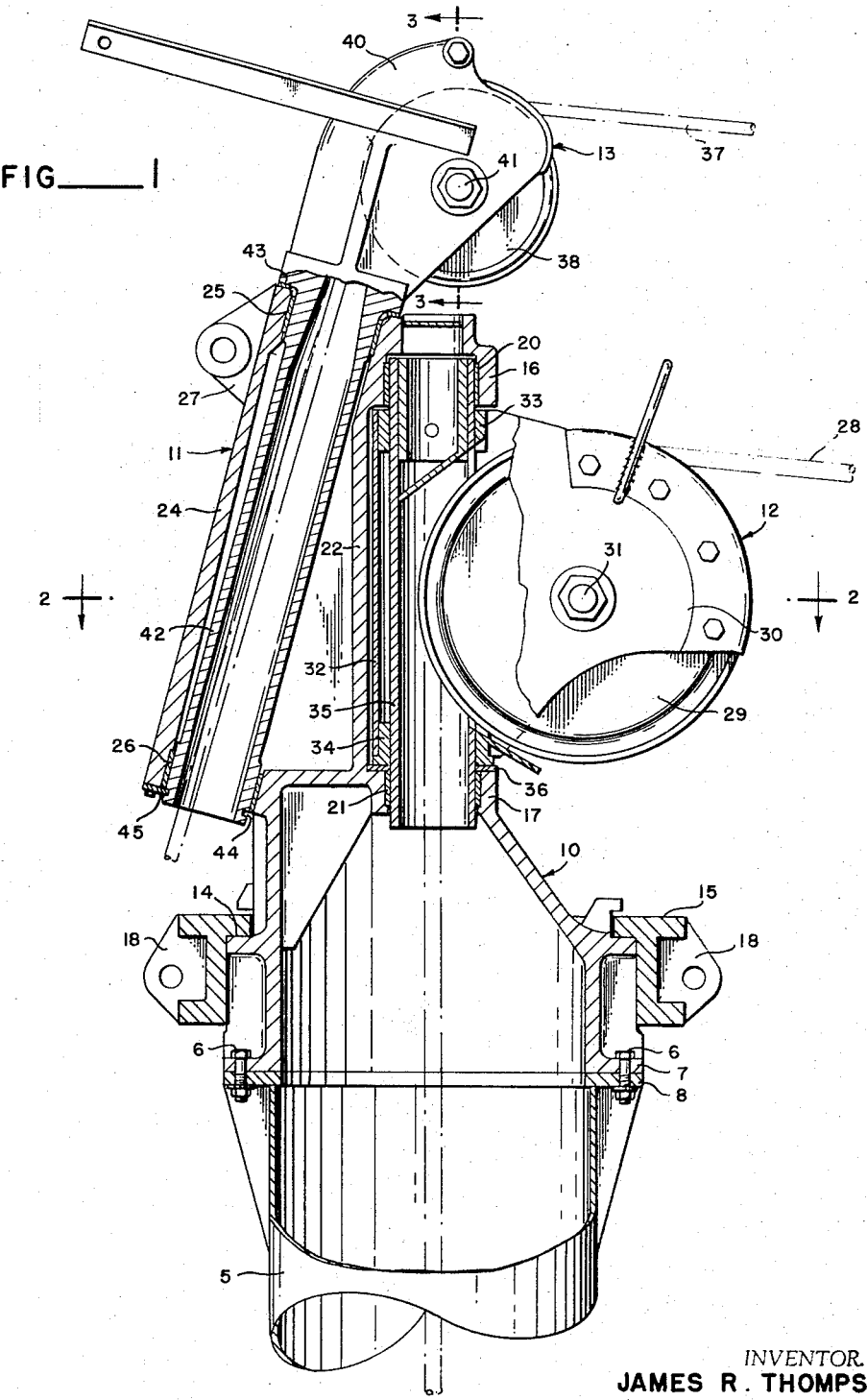

3,292,908
HEAD MOUNTING FOR MAIN AND HAULBACK SHEAVES OF A LOGGING SPAR
James R. Thompson, Seattle, Wash., assignor to Washington Iron Works, Seattle, Wash., a corporation of Washington
Filed Feb. 4, 1965, Ser. No. 430,406
8 Claims. (Cl. 254—190)

This invention relates to portable logging spars of the type having main and haulback sheaves located at the head end of the spar and with each sheave being carried by a respective block having its hub journaled for swivel movement about a generally vertical axis.

One object of the invention is to provide for said blocks a mounting member of advanced design which bolts to the head end of the spar and gives to the blocks a firm and balanced support.

Another object is to provide a mounting member so engineered as to prescribe for the main and haul-back lines, as the same run between the head end of the spar and ground-level spooling drums, paths of travel so separated one from the other as to positively preclude rubbing contact between the two.

As a further object still, the invention aims to provide sheave-carrying blocks which are themselves of advanced design and which, for inspection and servicing, admit of being removed from and applied to the mounting member with ease and expedition.

These, and yet additional objects and advantages of the invention looking to the provision of a trouble-free structure which is strong, durable, and relatively inexpensive to produce, will appear and be understood in the following description and claims, the invention consisting in the novel construction and in the adaptation and combination of parts hereinafter described and claimed.

In the accompanying drawings:

FIGURE 1 is a fragmentary vertical sectional view illustrating a portable logging spar equipped with head structure embodying preferred teachings of the present invention.

FIG. 2 is a fragmentary horizontal sectional view drawn to an enlarged scale on line 2—2 of FIG. 1.

FIG. 3 is a vertical sectional view on line 3—3 of FIG. 1; and

FIG. 4 is a reduced-scale elevational view taken from the same vantage point as FIG. 1.

Referring to said drawings, the numeral 5 denotes a hollow portable spar. A bonnet surmounts the spar and is secured thereto by bolts 6 which connect a base flange 7 of the bonnet to a head flange 8 of the spar. The bonnet is a casting formed at the bottom with an adapter section 10 and at the top providing a head 11 for the journal mounting of two self-aligning sheave-carrying blocks 12 and 13. The adapter section has an upwardly facing annular shoulder 14 located at or about its mid-height taking the thrust from an anchoring ring 15. The ring admits to turning motion about the center of the spar as an axis, and at spaced intervals of its circumference presents radial ears 18. Eyes provided in these ears accommodate fittings (not shown) for the connection of guy-lines to stabilize the erected spar.

The mounting head 11 has a furcate front part producing upper and lower arms 16 and 17 each bored on a vertical axis coinciding with the axial line of the spar. Bushings, as 20 and 21, provide journal liners for the two fork arms. The opening which lies between said arms faces to the front and has a back wall 22 developed concentric to the bores through an approximate half-circle arc to a diameter larger than that of the bores. Spaced-apart side walls 23 of the mounting head extend rearwardly from the front end limits of said arcuate back wall 22 in planes at opposite sides of and parallel with a median longitudinal vertical plane and, with a back wall 24 which slopes rearwardly in a downward direction, produce a hollow body part. At the bottom end this hollow body projects rearwardly beyond the back wall of the adapter section so as to materially overhang the latter. The top wall and said overhanging wall of the body part are bored on a coinciding axis biased from the axial line of the spar more or less parallel to the back wall 24 such that a downward projection of said biased axis clears the outer perimeter of the anchoring ring 15. Bushings 25 and 26 line said bores. An eyed ear 27 extends rearwardly from the upper end of the back wall 24 for the attachment of a stabilizing guy line (not shown).

Block 12 handles a main line 28, and its sheave 29 is received between cheeks 30 of the block, being journaled upon a pin 31 for rotation about a horizontal axis. In producing the block, a length of plate metal is bent upon itself to form the two cheeks. The bite 32 which lies therebetween is developed through somewhat more than 180° on the arc of a circle having a radius moderately less than that of the back wall 24. Sleeves 33 and 34 are made integral with the bite 32 at the two ends thereof. A spindle 35 is pinned or otherwise removably secured within the hub. Ends of the spindle project as trunnions. The trunnions are journaled for wrist motion in the bushings 20 and 21. A thrust washer 36 underlies the hub. The outwardly directed face of the spindle 35 is vertically slotted throughout substantially the full distance between sleeves 33 and 34. An inner portion of the sheave is freely received through this slot. The main line 28, passing over the sheave, extends by its inner end downwardly through the hollow center of the spindle into the communicating hollow center of the adapter section and thence through the hollow center of the spar to an opening formed in the side wall of the latter, from whence the line runs to the related winding drum of a ground-level yarder.

A haul-back line 37 is handled by the block 13. The sheave 38 therefor lies between separated walls of a hood 40, being mounted upon a pin 41 for rotation about a horizontal axis. The hood is formed with a depending hollow cylindrical stem 42 located so that its axis is tangent to the back side of the sheave, and this stem is journaled by its upper and lower ends in the two bushings 25 and 26. A downwardly facing shoulder provided at the upper end of the stem bears against a thrust washer 43. The lower end of the stem protrudes below the bushing 26 and presents a circumferential groove 44 to take a keeper 45. The haul-back line, passing over the sheave 38, extends downwardly through the hollow center of the stem 42 and thence in the space between two of the guy lines to the haul-back drum of the yarder.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In a head mounting for the main and haulback sheaves of a logging spar, in combination with the sheaves: a spar having a hollow top part, a mounting bonnet fixedly secured in surmounting relation upon said top part of the spar and formed to provide an adapter section at the bottom and a mounting section at the top, the adapter section having a hollow center communicating with the hollow center of the spar, the mounting section having a furcate front part producing a pocket facing forwardly between upper and lower fork arms and providing an after part overhanging the adapter section, a bore in said after part biased rearwardly from the axial line of the spar in a degree sufficient to clear the back wall of the adapter section and the subjacent spar, bushings lining the bore at the upper and lower ends thereof, vertical bores in the upper and lower fork arms having their axes coinciding, and each lined by a bushing, said bore in the lower fork arm communicating with the hollow center of the adapter section, a hollow spindle journaled by its ends for swivel movement in said bushings which line the bores of the fork arms and having the wall which lies between said journaled ends vertically slotted, a block having a hub portion secured to said spindle in the space between the fork arms and supporting the main sheave for rotation about a horizontal axis in a position placing the sheave's inner end within said slot tangent to the axial line of the spindle, a main line which passes over the sheave being adapted to run through the spindle and the adapter section into the spar, and a block supporting the haulback sheave for rotation about a horizontal axis in a position spaced above the main block and having a hollow depending stem journaled for swivel movement in said bushings of the biased bore and through which a haulback line passing over the sheave is adapted to run, the axial line of the stem lying tangent to the inner end of the haulback sheave, the length of the stem measured between the upper limit and the lower limit, respectively, of the concerned upper and lower bushings exceeding the length, lever arm considered, of the block from which said stem depends.

2. A head mounting as claimed in claim 1 in which the adapter and mounting sections are made as a unit casting, the adapter section being removably secured in place upon the spar.

3. A head mounting as claimed in claim 2 in which the adapter section is formed externally with an upwardly facing annular shoulder located concentric to the spar, and an anchoring ring journaled for turning motion upon the adapter section and taking a thrust bearing upon the shoulder.

4. A head mounting as claimed in claim 1, an eyed lug being provided upon the after part of the mounting section accommodating the attachment of a stabilizing guy line and located at a level at least as high as the infeed path of the main line.

5. A head mounting as claimed in claim 4, means being provided extending rearwardly from the haulback block well beyond a perpendicular raised from said eyed lug to accommodate the attachment of a stabilizing guy line.

6. A head mounting as claimed in claim 1, the pocket which is produced between said fork arms having its back wall developed through an approximate half-circle about the swivel axis of the spindle as a center, said main block being comprised of a length of plate metal bent upon itself to provide cheek walls at each side of the sheave and with the bite which lies therebetween developed through somewhat more than a half-circle on a radius moderately smaller than that of the back wall to serve as the hub of the block.

7. In a head mounting for the main and haulback sheaves of a logging spar, in combination with the sheaves: a spar having a hollow top part, a mounting bonnet fixedly secured in surmounting relation upon said top part of the spar, said bonnet having a furcate front part producing a pocket facing forwardly between upper and lower fork arms bored vertically on a coinciding axis and providing an after part spaced to the rear from said front part and bored on a steeply inclined axis biased rearwardly top to bottom from the axial line of said co-axial bores, the bore in the lower fork arm communicating with the hollow center of the spar's top part, the biased bore being so placed that a downward projection of its axial line lies to the outside of the spar, a hollow spindle journaled by its ends for swivel movement in said co-axial bores of the bonnet's furcate front part and having the wall which lies between said journaled ends vertically slotted, a block having a hub portion secured to said spindle in the space between the fork arms and supporting the main sheave for rotation about a horizontal axis in a position placing the sheave's inner end within said slot tangent to the hollow center of the spindle so that a main line which passes over the sheave leads downwardly through the spindle's hollow center into the spar, a hollow stem journaled for swivel movement in said biased bore of the bonnet's after part, and a block from which said stem depends surmounting the after part of the bonnet and supporting the haulback sheave for rotation about a horizontal axis in a position spaced above the main block and placing the sheave's inner end tangent to the hollow center of the stem so that a haulback line which passes over the haulback sheave leads downwardly through the stem's hollow center and thence exteriorly of the spar, the ways through which said main and haulback lines pass in running through the bonnet being completely isolated one from the other.

8. A head mounting as claimed in claim 7 characterized in that the journaled length of the stem exceeds the length, lever arm considered, of the block from which said stem depends.

References Cited by the Examiner
UNITED STATES PATENTS

| | | | |
|---|---|---|---|
| 2,745,559 | 5/1956 | McIntyre | 212—7 |
| 3,015,471 | 1/1962 | Madill | 254—139.1 |
| 3,033,526 | 5/1962 | Priest | 254—139.1 |
| 3,045,973 | 7/1962 | Slagle | 254—139.1 |

SAMUEL F. COLEMAN, *Primary Examiner.*